United States Patent [19]

Hoffman

[11] Patent Number: 4,594,042
[45] Date of Patent: Jun. 10, 1986

[54] DEVICE FOR STACKING MICROCASSETTES

[75] Inventor: Wayne C. Hoffman, Norwalk, Conn.
[73] Assignee: Pitney Bowes Inc., Stamford, Conn.
[21] Appl. No.: 629,157
[22] Filed: Jul. 9, 1984
[51] Int. Cl.⁴ ............... B65G 57/30; B65G 60/00; G11B 15/68; G11B 23/04
[52] U.S. Cl. ............... 414/32; 360/92; 414/93; 414/95
[58] Field of Search ............... 414/32, 92, 93, 95; 271/212; 360/92

[56] References Cited

U.S. PATENT DOCUMENTS

| | | | |
|---|---|---|---|
| 2,133,259 | 10/1938 | Wolff | 414/32 |
| 2,749,120 | 6/1956 | Mallory | 414/92 |
| 3,756,608 | 9/1973 | O'Neill et al. | 360/92 |
| 3,758,122 | 9/1973 | Kawaharasaki | 414/32 X |
| 3,883,895 | 5/1975 | Kawaharasaki | 360/92 |
| 3,972,407 | 8/1976 | Kushigian | 198/347 X |
| 4,092,685 | 5/1978 | Sander et al. | 360/92 |

*Primary Examiner*—Leslie J. Paperner
*Attorney, Agent, or Firm*—Melvin J. Scolnick; William D. Soltow, Jr.; Albert W. Scribner

[57] ABSTRACT

An improvement in a changer apparatus of the type having a recording deck to which individual recording media are transported, one at a time, and an output stack for receiving and storing in stack configuration recording media that have been removed from the recording deck, including a device for laterally transporting a recording medium to the output stack, the improvement comprising a lifting element disposed at the output stack and contacted by the recording medium that is laterally transported to the output stack to raise those recording media then stored in the output stack, whereupon the laterally transported recording medium is positioned as the bottommost medium in the output stack.

9 Claims, 23 Drawing Figures

DEVICE FOR STACKING MICROCASSETTES

BACKGROUND OF THE INVENTION

This invention relates to recording/reproducing apparatus and, more particularly, to a changer apparatus which operates with a record/playback deck to bring fresh recording media (for recording messages or for transcribing or playing back information) to that deck and to remove used media (i.e., those media on which messages have been recorded or played back) from that deck.

In the field of dictation, central systems having, for example, a centrally disposed recorder selectively coupled to one of several dictating stations, as by a dedicated communication link (e.g. "hard-wired") or by telephone, have become popular. In one type of central dictation system, messages, such as letters, reports, memoranda and the like, are recorded on discrete recording media such as magnetic tape cassettes. Depending upon the preset parameters established by the users of the dictation system, a cassette having one or more messages recorded thereon is replaced automatically with a fresh cassette to permit further messages to be recorded. The messages that have been recorded on the used cassette then are transcribed by, for example, a conventional desk-top transcribing machine. A similar central system has been used for transcribing messages from cassettes, wherein a cassette is replaced when transcription of the messages recorded thereon has been completed.

By centrally disposing the recorder, access thereto is presented to several dictators who are furnished with respective dictating stations or with so-called telephone dictation modules from which messages may be transmitted, and which operate to control the usual dictating functions, such as record, playback, rewind, fast forward and the like. After one dictator has terminated his usage of the centrally disposed recorder, the recorder is made available to be accessed by another. Typically, the recording medium, or cassette, on which the dictator has dictated his messages may be replaced, or ejected, after a predetermined length of tape has been consumed, or after a predetermined number of messages have been recorded, or after a predetermined number of different dictators have recorded messages thereon or after a predetermined amount of time has elapsed since the first message was recorded. Examples of central dictation systems using cassette changers are described in, for example, U.S. Pat. Nos. 4,071,857; 4,092,679; 4,092,685; and 4,099,209.

In the cassette changer central dictation systems of the type described in the aforementioned patents, a cassette is transported via a conveyor-type mechanism from an input supply, or stack, to a recording deck. The deck is mounted in a movable support which positions that deck in operable relation with the cassette that has been transported thereto. Then, after the predetermined length of tape has been consumed, or after the preset number of messages have been recorded, or after the preset number of dictators have used the cassette, or after a predetermined duration of inactivity has elapsed, the deck is displaced and the conveyor mechanism continues in its transportation of the used cassette to an output stack. Concurrently with this ejection of the cassette from the recording deck, a fresh cassette is transported by the conveyor mechanism from the input stack to that deck. As also described in the aforementioned patents, if a cassette has been designated a "priority" cassette, that is, if the message or messages recorded on that cassette are to be transcribed promptly and on a "priority" basis, the used cassette is discharged to a special priority discharge chute. There, the "priority" cassette may be given to a transcriptionist immediately. The transcription of such "priority" cassettes need not be deferred until all other used cassettes which precede that "priority" cassette have been transcribed.

The cassette changer apparatus of the aforedescribed type has been provided with one motor to drive the cassette-conveyor mechanism, another motor to drive the recording deck into operable relation with the cassette, and yet another motor to lift the used cassette into the output stack. The operation of all three motors is coordinated by electronic logic circuitry which, in one embodiment has been implemented in the form of discrete components and in another embodiment has been implemented in the form of a specially programmed microprocessor.

Other cassette changer devices have been known. For example, a shuttle carriage has been proposed for transporting, or "shuttling," a cassette from a horizontal input stack to a recording deck and then, after one or more messages have been recorded, from that deck to a horizontal output stack. Another example, similar to a photographic slide projector, displaces a cassette from an input magazine, lowers that cassette onto a recording deck, returns the used cassette from the deck to the magazine, and then advances the magazine to access the next cassette therein. A further example is provided with a vertical input stack of cassettes from which the bottommost cassette is lowered onto a recording deck and then, after one or more messages have been recorded, that cassette is lifted from the deck and discharged.

One problem attending many of the aforementioned cassette changers resides in the coordination of removing a used cassette from the recording deck and replacing it with a fresh cassette from an input supply. Typically, separate drive motors are used to transport a fresh cassette to the recording deck, load that cassette onto the deck, and eject a used cassette from that deck to an output port. It is appreciated that such coordination may be achieved by electronic control circuitry or microprocessors, as mentioned above, or by a relatively complex mechanical interlocking arrangement. The use of plural drive motors, control electronics, and mechanical interlocking arrangements is relatively expensive and moreover, may be difficult to service in the event that maintenance or repairs become necessary.

The present invention proceeds by using a relatively simple drive arrangement which inherently provides proper coordination among the various cassette-changing operations--transporting a fresh cassette to the recording deck, disposing that cassette in operable relation with the deck and ejecting a used cassette from the deck to a suitable output port. Moreover, the operating principles of the present invention permit it to be readily adapted for use as a cassette changer with standard size cassettes, with minicassettes, with microcassettes or with the new extremely small cassette described in, for example, U.S. Pat. No. 4,443,827.

OBJECTS OF THE INVENTION

Therefore it is an object of the present invention to provide improved changer apparatus for use with recording media, such as recording media housed in cartridges or cassettes.

Another object of this invention is to provide improved changer apparatus of the aforementioned type which is of relatively simple construction yet exhibits accurate operation, and is relatively simple and inexpensive to maintain and/or repair.

Another object of this invention is to provide in changer apparatus of the aforementioned type a single motor which operates to transport a cassette from an input stack to a recording deck and further operates to eject a used cassette from that deck to an output stack.

An additional object of this invention is to provide changer apparatus of the aforementioned type which permits a "priority" designated cassette to be transported to a suitable priority location from which it can be retrieved and transcribed on a priority basis.

A further object of this invention is to provide an improved lifting arrangement to raise, or lift up, a stack of cassettes so as to permit a new cassette to be disposed to the bottom of that stack.

Another object of this invention is to provide changer apparatus which can be used with different types of recording media, such as standard size cassettes, minicassettes, microcassettes, cassettes of even smaller size, and other types of recording media, preferably housed in cartridges.

Various other objects, advantages, and features of the present invention will become readily apparent from the ensuing detailed description, and the novel features will be particularly pointed out in the appended claims.

SUMMARY OF THE INVENTION

In accordance with this invention, changer apparatus is provided with an input hopper for storing a plurality of recording media, such as magnetic tape cassettes, and an output hopper for storing cassettes that have had messages recorded thereon by a recording deck. A movable withdrawing element operates to withdraw a cassette from the input hopper and deliver that cassette to a receiving device which, in turn, disposes that cassette to the recording deck. The receiving device is further operable to remove a cassette from the recording deck to the output hopper before receiving the withdrawn cassette. A rotatable cam is drivingly coupled to the withdrawing element and further includes a cam surface coupled to the receiving device, whereby the receiving device is driven to remove one cassette from the recording deck to the output hopper and replace it with the next cassette.

In accordance with one feature of this invention, the withdrawing element is comprised of a pusher arm coupled to the cam by a pin connection so as to reciprocate between opposite extreme positions as the cam makes one complete rotation. As one aspect, the pusher arm is provided with a groove in which the pin connection rides, the pusher arm being biased toward the pin connection and being angled such that, as the pin connection rides in the groove, the pusher arm is driven in a direction substantially normal to its reciprocating direction, thereby exhibiting a withdrawing movement in one plane and a return movement in another.

In accordance with another feature of this invention, the receiving device is comprised of an elevator having a platform for supporting a cassette and a cam-follower which cooperates with the cam surface to raise this platform from the recording deck to the output hopper which, advantageously, is in the form of a vertical stack located above the recording deck, and then return the platform from the output hopper to an intermediate position to receive the withdrawn cassette and then lower that cassette onto the recording deck. As one aspect, the elevator includes at least one hold-down arm to maintain a cassette on the platform, the hold-down arm being swingable out of interference with the cassette when the platform is raised, thereby permitting that cassette to be positioned at the bottom of the output hopper.

As yet another feature of this invention, priority discharge apparatus is provided to selectively remove a predetermined cassette from the output hopper in the event that cassette has been designated a "priority" cassette. More particularly, if the last cassette which has been ejected from the recording deck to the output hopper has been designated a priority cassette, the priority discharge mechanism is operated to transport that cassette from the output hopper to a priority hopper. As one aspect, the priority discharge apparatus includes a movable finger for engaging the bottommost cassette in the output hopper, this finger being coupled by a lead-screw follower to a lead screw. The lead screw is driven in one direction to advance the finger so as to eject a cassette from the output hopper, and in the opposite direction after the ejected cassette has been transported to the priority hopper so as to return that finger to a "standby" position.

Still another feature of this invention is to provide in changer apparatus of the aforementioned type wherein a cassette is laterally transported to an output stack, an improved lifting mechanism at the output stack which is contacted by the laterally transported cassette to raise those cassettes then stored in the output stack, whereupon the laterally transported cassette is positioned at the bottom of the output stack.

BRIEF DESCRIPTION OF THE DRAWINGS

The following detailed description, given by way of example, and not intended to limit the present invention solely thereto, will best be understood in conjunction with the drawings, also intended not to limit this invention solely to such illustrations in which.

DETAILED DESCRIPTION OF A PREFERRED EMBODIMENT

In the interest of simplification, the recording medium with which the changer apparatus of the present invention is described herein is assumed to be a magnetic tape cassette. It will be appreciated, however, that other discrete recording media can be used, such as magnetic disks, magnetic tape cartridges, and other discrete recording media. The term "cassette" as used herein is intended to refer not only to conventional magnetic tape cassettes but also to such other discrete recording media. Furthermore, it will be appreciated that the cassettes with which the changer apparatus of the present invention can be used may be standard size cassettes, minicassettes, microcassettes, or the even smaller cassettes described in U.S. Pat. No. 4,443,827. The term "cassette" is, of course, intended to refer to any or all of these magnetic tape cassettes and discrete recording media.

Referring now to the drawings, in which like reference numerals are used throughout, the cassette changer apparatus of the present invention is identified generally by reference numeral 20 and is intended to be used either with a single dictating station from which a dictator may record one or more messages on a cassette, as will be described, or with a central dictation system, by which cassette changer 20 is electrically connected to a selected one of several dictating stations, as by a hard-wired connection or by telephone, whereby any one of several dictators individually may record messages on a cassette. Cassette changer 20 is comprised of a base 22, opposite side supports 24 and 26 (shown in FIGS. 1, 2, 6 and 7), and a U-shaped rear panel 30 which extends between and beyond side supports 25, 26. One leg 32 of U-shaped rear panel 30 cooperates with a side wall 40 and a portion of the rear panel to form an input hopper 28 which is adapted to receive a stack of cassettes, referred to herein as input cassettes $TC_I$. As best shown in FIGS. 1 and 8–10, an output hopper 42 is formed by a pair of side walls 44 and 46 which are supported by and extend forwardly of rear panel 30. Output hopper 42 is adapted to store a stack of used cassettes, that is, cassettes which have been ejected from the recording deck (described below) and upon which one or more messages have been recorded. The cassettes which are stored in output hopper 42 are referred to herein as output cassettes $TC_O$. Finally, and optionally, a priority hopper 48 is formed of the remaining leg 34 of U-shaped rear panel 30 (FIG. 1) which forms a side wall 52, in combination with yet another side wall 50, this being best illustrated in FIGS. 8–10. Priority hopper 48 thus is seen to be formed of two side walls 50 and 52 in combination with a portion of rear panel 30. Preferably, although not necessarily, the spacing between input hopper 28 and output hopper 42 is shielded by a front panel 54 which extends between side walls 40 and 44; and, similarly, the spacing between output hopper 42 and priority hopper 48 is shielded by a front panel 56 which extends between side walls 46 and 50.

Input cassettes $TC_I$ are properly maintained in input hopper 28 and are prevented from being inadvertently misaligned or discharged therefrom by the projection of flange 36 (which extends from leg 32 of U-shaped rear panel 30) and by a similar projection of front panel 54, these projections serving to partially block the front wall of each cassette in the input hopper. Similarly, projections of front panels 54 and 56 serve to prevent the inadvertent misalignment or discharge of cassettes in the output hopper; and similar projections are provided by flange 38 of leg 34 and a projection of front panel 56, thereby preventing the accidental misalignment or discharge of cassettes from priority hopper 48. Front panel 56 is seen to end in a bottom edge 57 (FIG. 1); and this front panel, together with front panel 54 and rear panel 30 may be of one-piece construction. The particular machining, manufacturing and construction of these elements is not critical. Suffice it to say that an input hopper, an output hopper and a priority hopper are formed. The manner in which cassettes are transported between these hoppers will be described below.

Disposed within and, more accurately, below, input hopper 28 is a cassette support platform 58, seen in FIGS. 1 and 2. The stack of input cassettes $TC_I$ is supported on cassette support platform 58. A slot 59 (best seen in FIG. 2) is formed in the cassette support platform to permit an upstanding finger 62 of a pusher arm 60 to move through the slot. As will be described in greater detail below, pusher arm 60 is reciprocatingly driven such that upstanding finger 62 thereof contacts a side wall of the bottommost cassette within input hopper 28 to withdraw, or push, that cassette from the input hopper and onto a receiving platform which operates to dispose that cassette at the recording deck. As will be described, pusher arm 60 is driven about a pivot axis 274 (FIG. 2) in left-to-right direction to withdraw the bottommost cassette from input hopper 28, and then this pusher arm is pivoted in the right-to-left direction about pivot axis 274 to return to the position whereby it is positioned to withdraw the next cassette from the input hopper. That is, as best shown in FIG. 2, pusher arm 60 is reciprocatingly driven from the position represented by broken lines to that represented by the solid lines and then to return to that position represented by the broken lines. As will be described, when returning from its rightmost position to its leftmost position, pusher arm 60 is displaced to a lower horizontal plane so as to return to its leftmost position without interfering with the stack of cassettes stored in input hopper 28.

As illustrated in FIG. 2, when in its leftmost position, pusher arm 60 extends beyond leg 32. As shown in FIG. 1, this leg is provided with an opening 64 therein to prevent the extremity of pusher arm 60, and particularly finger 62 thereof, to pass out of and then re-enter input hopper 28.

Figure 1:
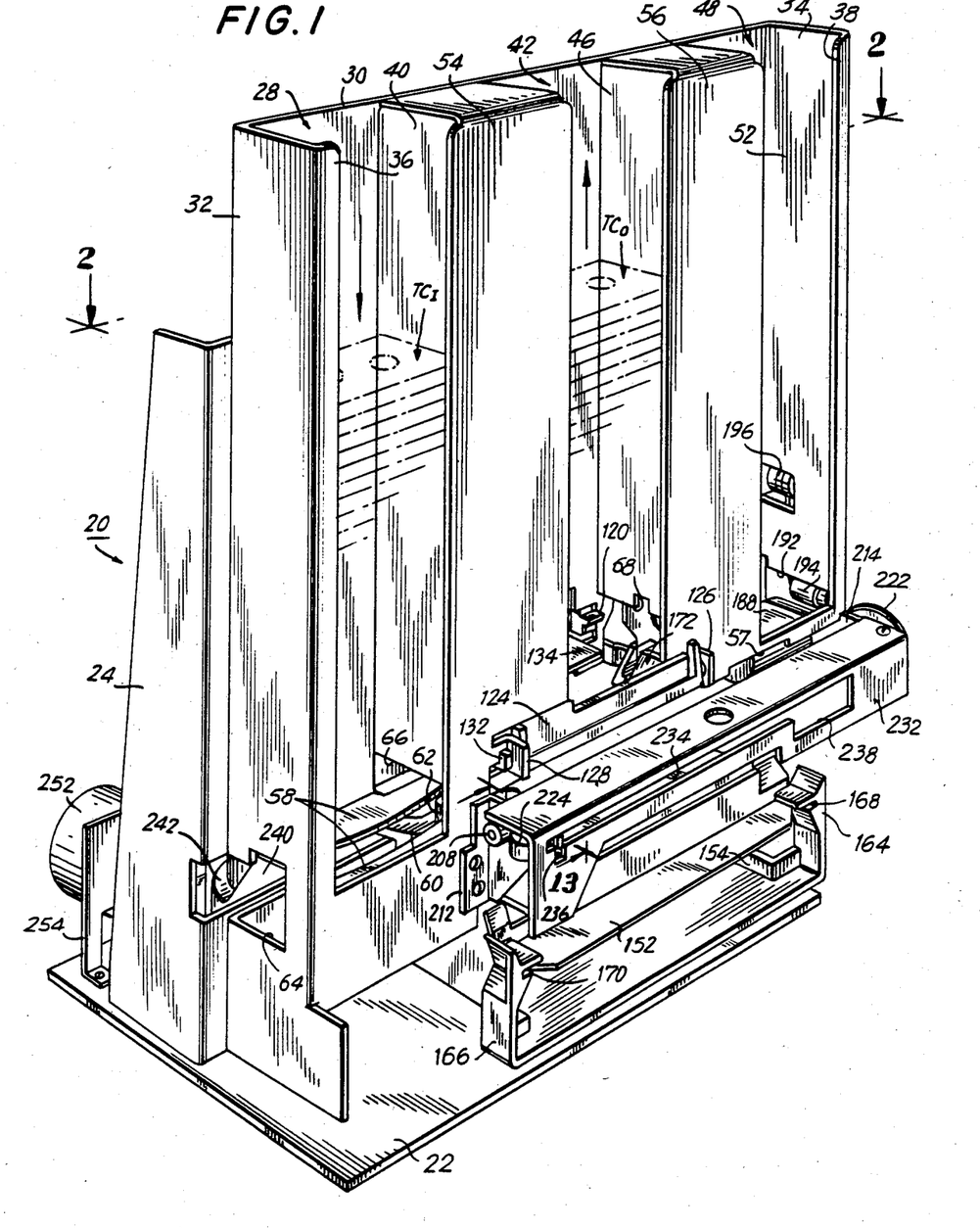
FIG. 1 is a perspective front view of an embodiment of the present invention.
Figure 2:
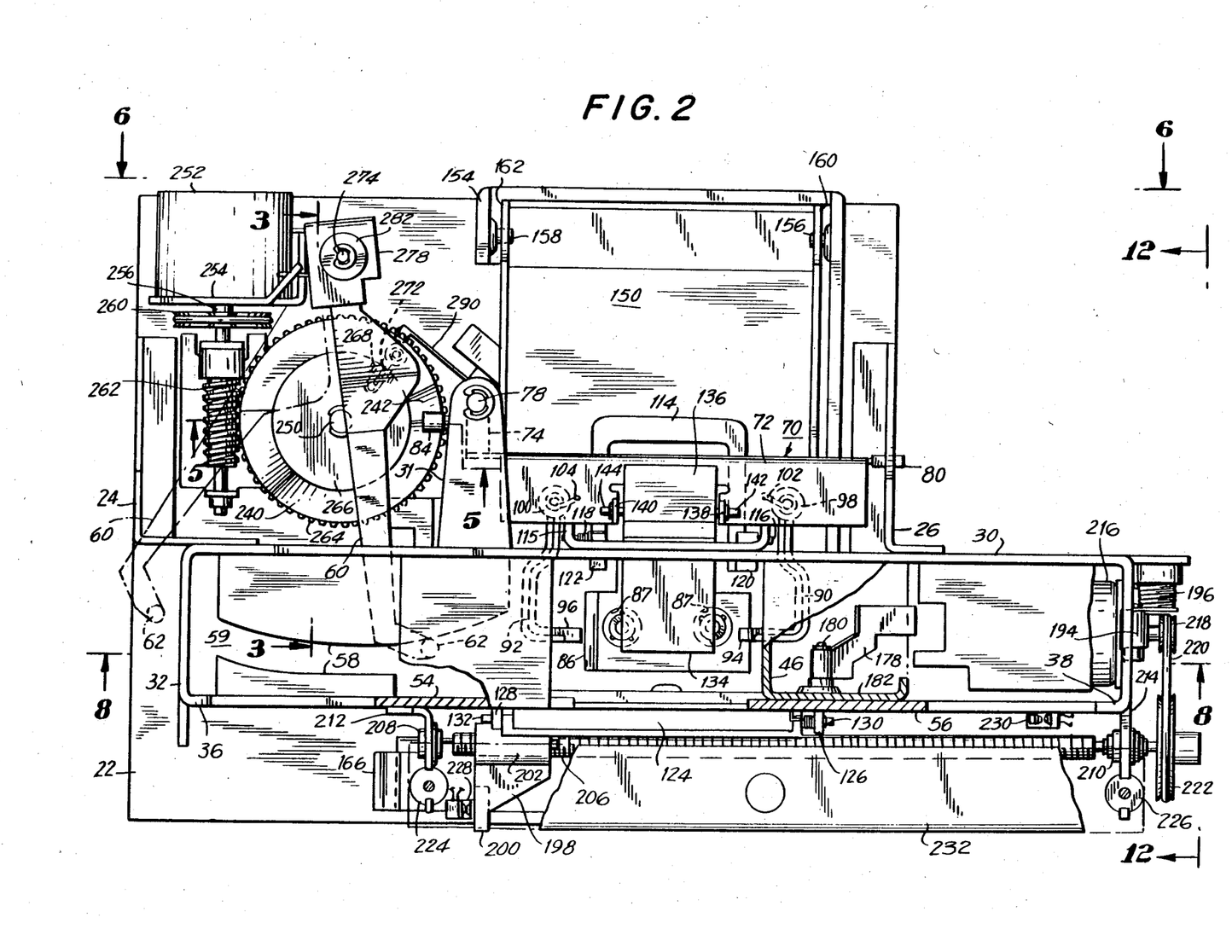
FIG. 2 is a top view taken along the line 2—2 of FIG. 1.
Figure 3:
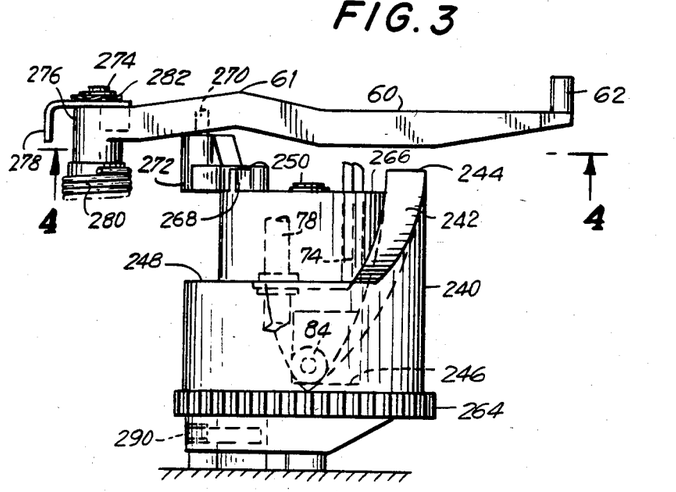
FIG. 3 is a sectional view of the withdrawing element used with this invention taken along the line 3—3 of FIG. 2.
Figure 4:
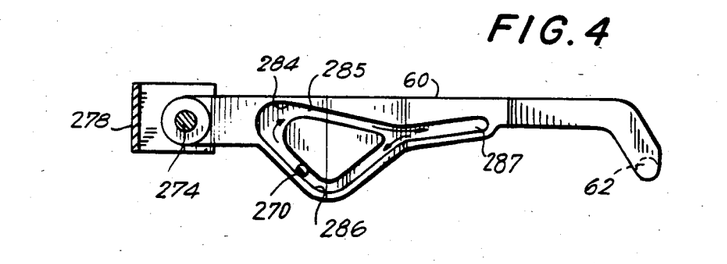
FIG. 4 is a bottom view of the pusher arm used as the withdrawing element taken along the line 4—4 of FIG. 3.
Figure 5:
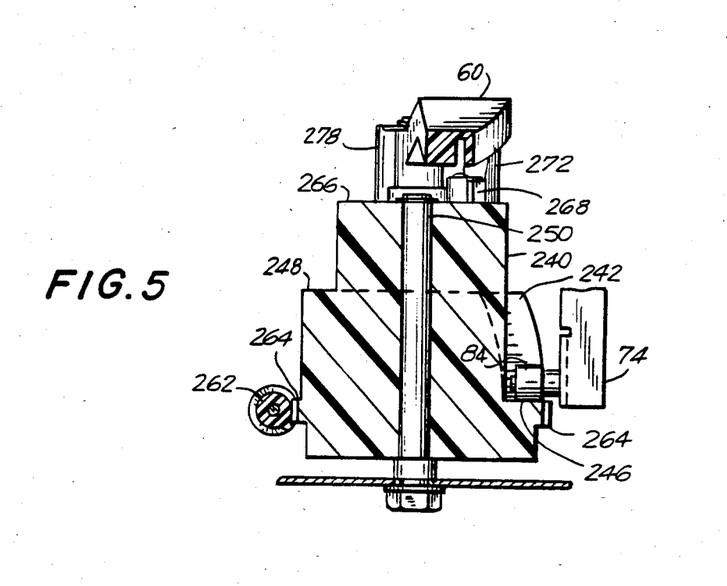
FIG. 5 is a sectional view taken along the line 5—5 in FIG. 2.

As best seen in FIG. 1, side wall 40 of the input hopper is provided with an exit slot 66 through which the bottommost cassette (identified as cassette $TC_n$) is withdrawn from the input hopper and transported to an elevator which is disposed below output hopper 42. As mentioned above, the purpose of the elevator is to receive the cassette which is withdrawn from input hopper 28, to lower that cassette onto the recording deck for the recording of messages thereon, and then to eject that cassette from the recording deck and position it at the bottom of the stack of output cassettes $TC_O$ which are stored in output hopper 42. This reciprocating, vertical movement of the elevator is carried out by the elevator structure generally indicated in FIG. 2 by reference numeral 70.

Figure 6:
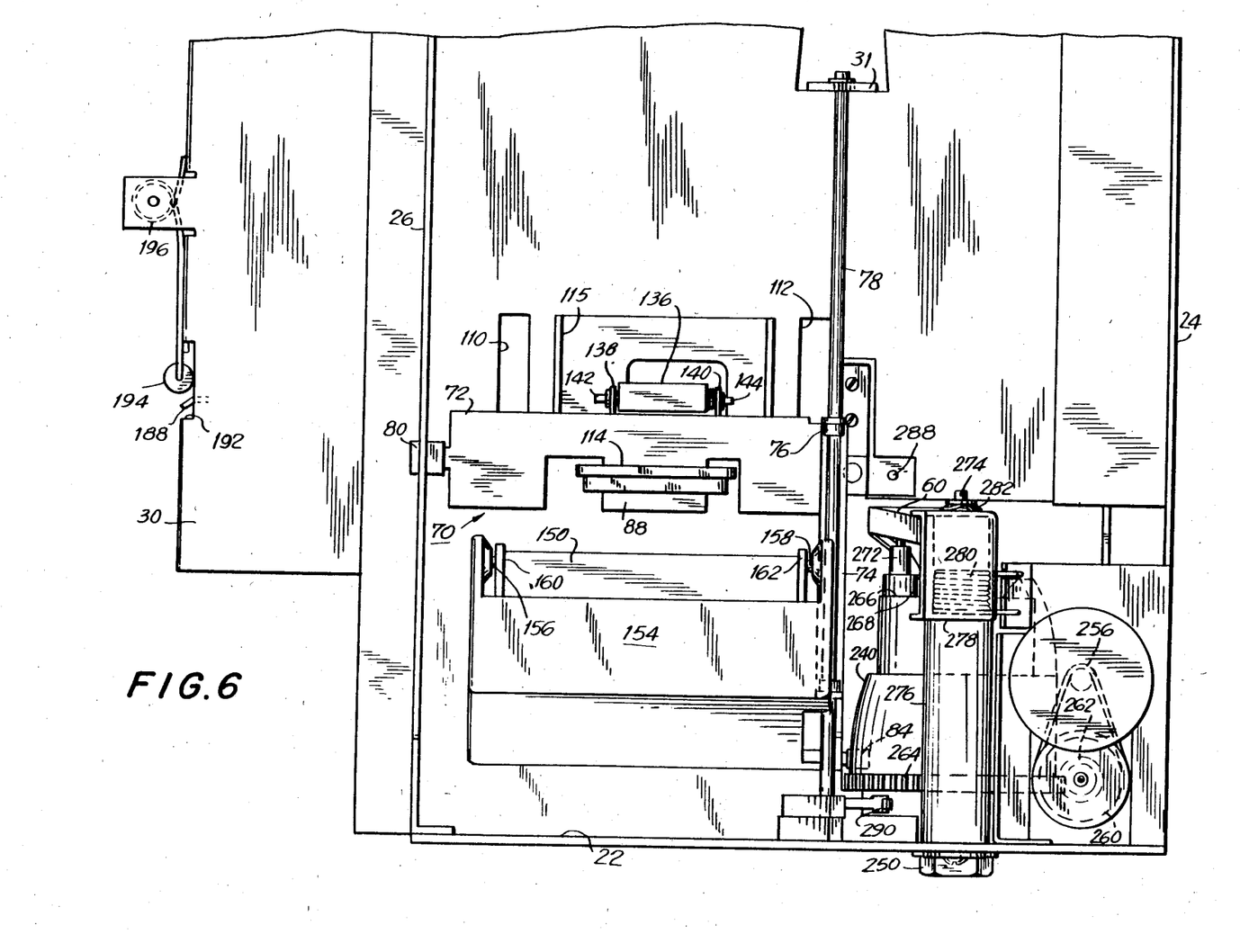
FIG. 6 is a rear view of the changer apparatus, taken along the line 6—6 of FIG. 2.
Figure 7:
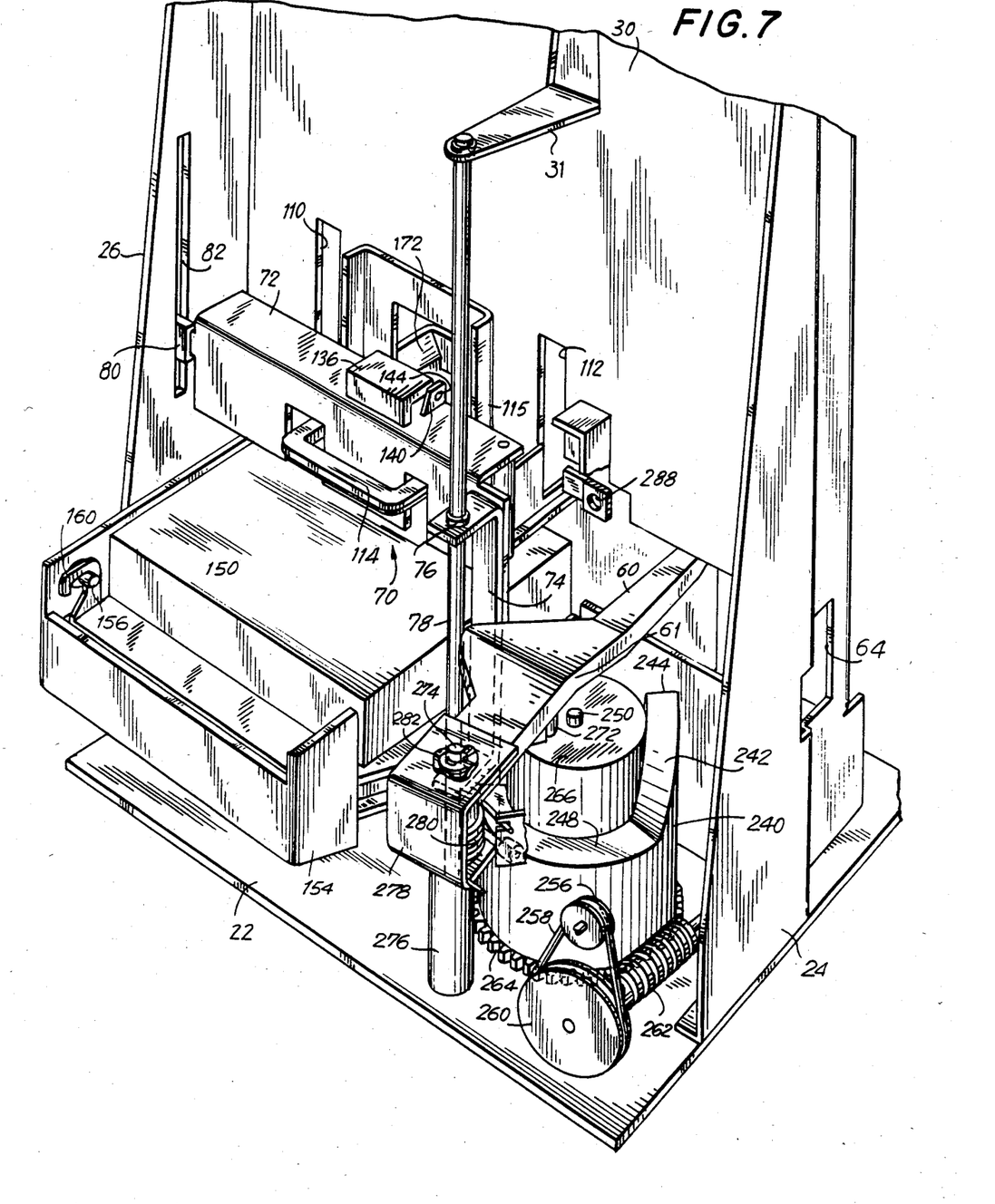
FIG. 7 is a perspective rear view of the apparatus shown in FIG. 6.

As shown in FIG. 2, and also shown in FIGS. 6 and 7, elevator 70 is comprised of a frame 72 to which an L-shaped arm 74 is coupled, this arm being provided with a bushing 76 to permit the arm and frame to slide along a guide shaft 78. This guide shaft is positioned between a rearwardly-projecting extension 31 which extends from rear panel 30 and base 22. Frame 72 also is provided with a guide tab 80 which, as shown in FIGS. 6 and 7, projects from a side edge of frame 72, this tab riding in a guide slot 82 formed in side support 26.

Figure 8:
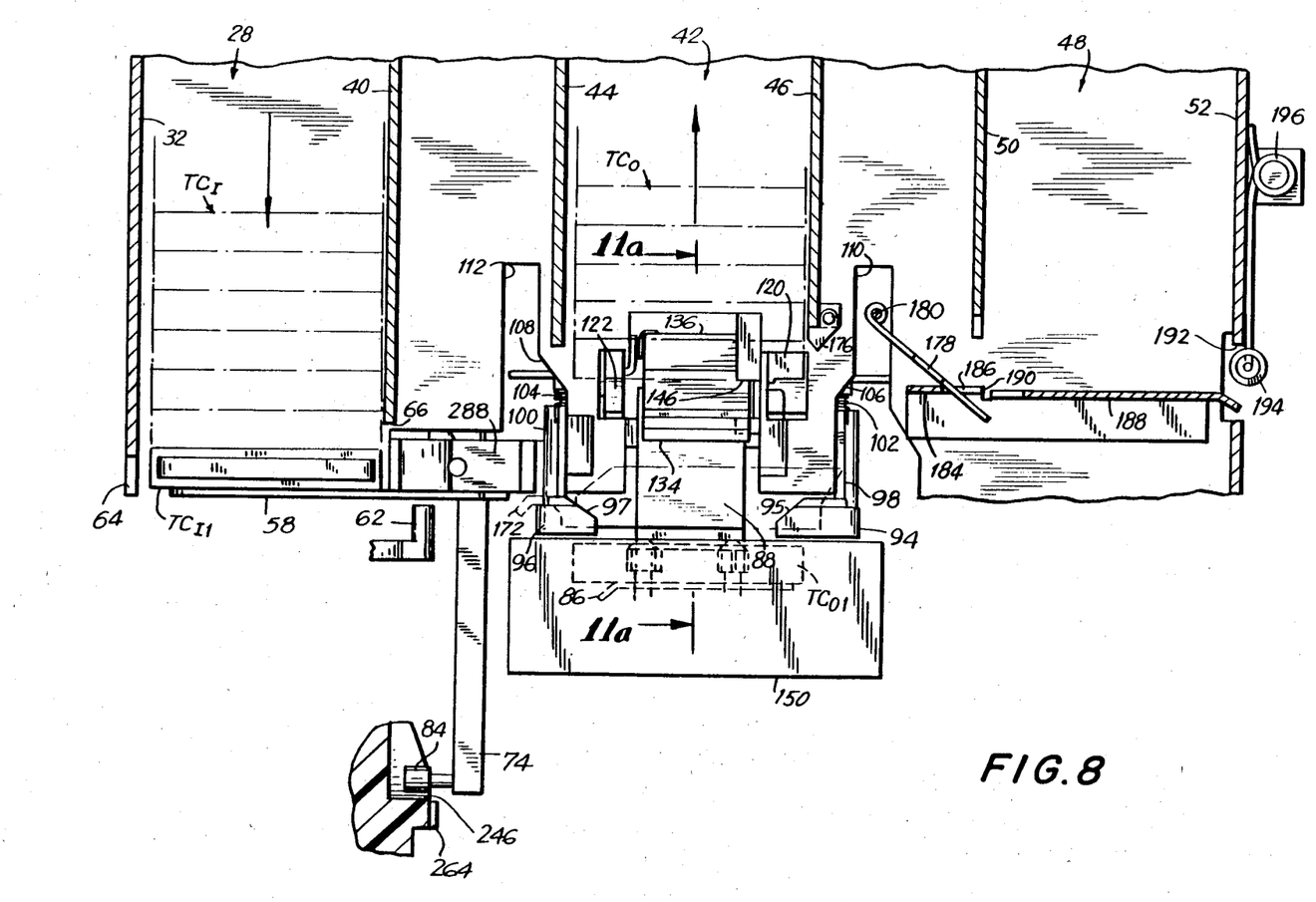
FIG. 8 is a sectional view taken along the line 8—8 of FIG. 2, illustrating the initial or "home" positions of the pusher arm and elevator used in the preferred embodiment of this invention.

As shown in FIGS. 2 and 6, and as best seen in FIG. 8, a roller 84 is mounted on L-shaped arm 74, this roller functioning as a cam follower to be described. Suffice it to say that roller 84 rides along an irregular surface 242 of a cam 240 to transfer vertical movement to elevator 70. As will be explained, when roller 84 rides along cam surface 242 to a peak thereof, elevator 70 is driven in the upward direction to deposit a cassette carried thereon to the bottom of the stack of output cassettes $TC_O$. When roller 84 rides from the peak of cam surface 242 to intermediate portion, the elevator is driven in the downward direction to a receiving location aligned with cassette support platform 58 so as to receive a cassette pushed onto the elevator by pusher arm 60. Then, when roller 84 rides along cam surface 242 from the intermediate portion to a trough, elevator 70 loads the cassette thereon into operating relation with the recording deck.

From FIGS. 2 and 8–11, it will be seen that elevator 70 is provided with cassette-receiving platform 86 that is mounted on frame 72 by means of a tongue 88. Thus, as frame 72 is driven upwardly and downwardly, tongue 88 and platform 86 likewise are driven therewith. It is appreciated that platform 86 is adapted to receive and support a cassette.

Figure 9:
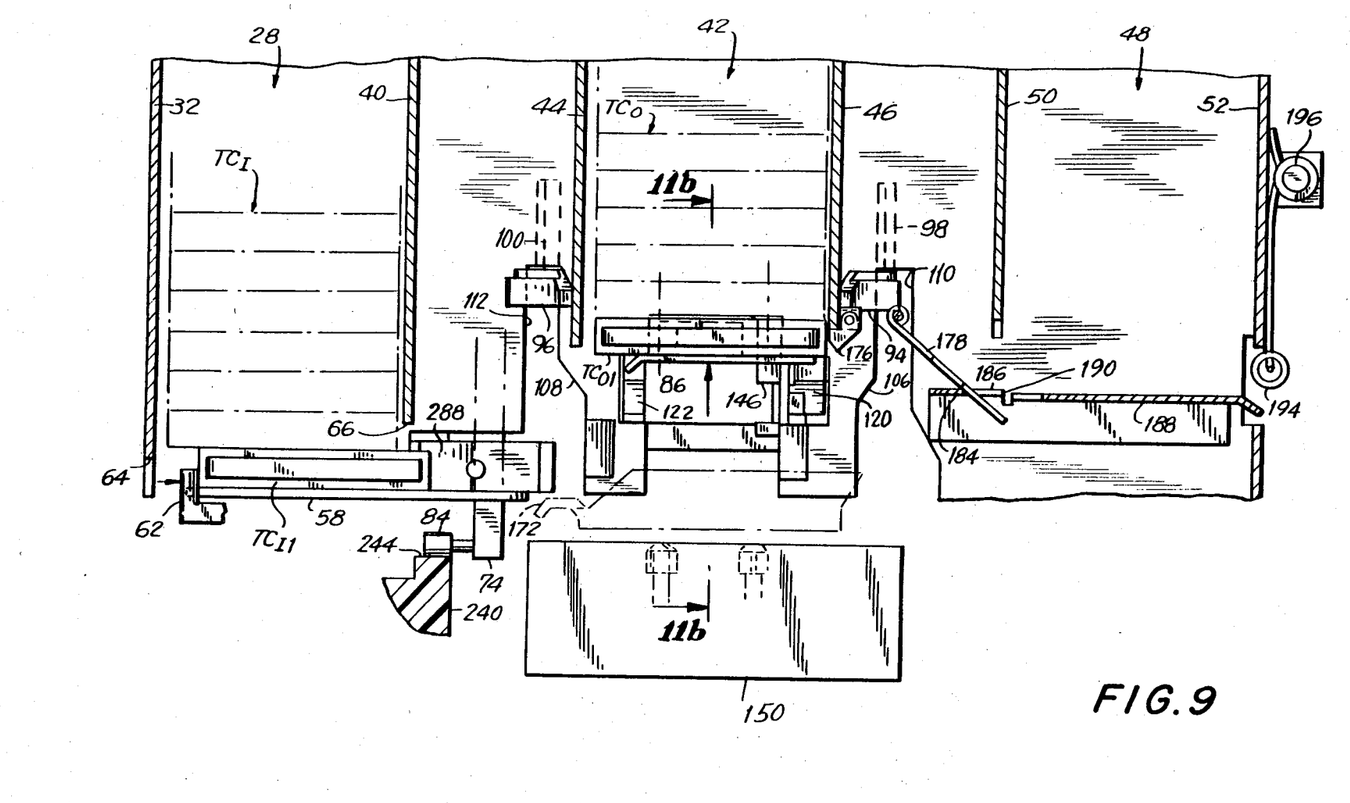
FIG. 9 is a view similar to that shown in FIG. 8 and showing the elevator in its uppermost position and the pusher arm in the position by which the bottommost cassette is in the process of being withdrawn from the input hopper of the changer apparatus.
Figure 10:
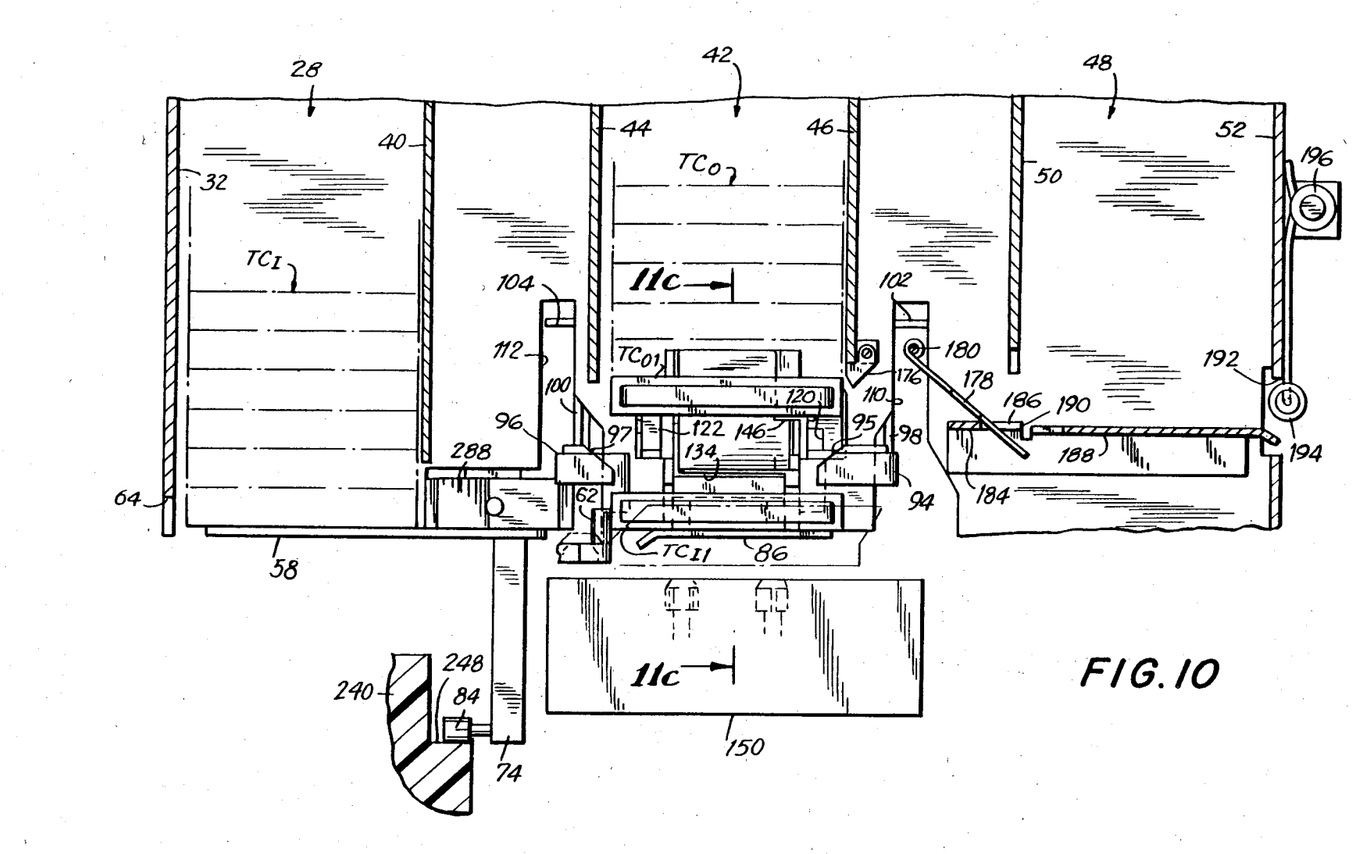
FIG. 10 is a view similar to that shown in FIG. 8, showing the elevator in its intermediate position for receiving the cassette that has been withdrawn by the pusher arm from the input hopper.

Elevator 70 additionally includes a pair of hold-down arms 90 and 92 which, as shown in FIG. 2, are L-shaped and terminate in claw-shaped feet 94 and 96 respectively. The purpose of these hold-down arms and, particularly, claws 94 and 96, is to maintain a cassette on platform 86 when elevator 70 lowers that cassette onto the recording deck and to make sure that the cassette is seated properly on, or in good registration with, the deck during a recording or playback operation. Advantageously, claws 94 and 96 are mounted so as to pivot, or swing away, when elevator 70 rises to dispose the cassette on platform 86 at the bottom of the stack of output cassettes $TC_O$. Accordingly, hold-down arms 90 and 92 extend from pivotable posts 98 and 100, respectively, these posts being pivotally coupled to frame 72, as shown in FIG. 2. Advantageously, spring elements 102 and 104 bias posts 98 and 100 to urge hold-down arms 90 and 92 to the position shown in FIG. 2. As best illustrated in FIG. 8, claws 94 and 96 are provided with inclined surfaces 95 and 97, respectively, these surfaces being provided generally on the top of the claws. Inclined surfaces 95 and 97 are adapted to contact cam surfaces 106 and 108, respectively, of a vertical wall in the output hopper, the inclined surfaces of the claws being brought into contact with the cam surfaces of the vertical wall when elevator 70 is raised. It is recognized that the forces exerted on claws 94 and 96 when their inclined surfaces contact cam surfaces 106 and 108 serve to pivot posts 98 and 100 so as to move the hold-down arms to noninterfering positions. This, in turn, permits the cassette supported on platform 86 to be raised to the bottom of the stack of output cassettes $TC_O$ in output hopper 42. As best shown in FIG. 8, the aforementioned vertical wall on which cam surfaces 106 and 108 are disposed is provided with guide slots 110 and 112 to accommodate claws 94 and 96 when the hold-down arms pivot to the aforementioned noninterfering position. The accommodation of claws 94 and 96 within guide slots 110 and 112 is best seen in FIG. 9.

Elevator 70 also includes a blocking member 134 (partially shown in FIG. 1 and shown more clearly in FIG. 11) which is disposed below the output stack of cassettes $TC_O$ and functions to prevent inadvertent dislocation of a cassette, such as the bottommost cassette in output hopper 42, to interfere with elevator platform 86 or with a cassette that already is supported on that platform. As will be described, the recording deck is disposed beneath and aligned with output hopper 42, and blocking member 134 prevents a cassette from dropping down into interference with the recording deck.

Figure 11A:
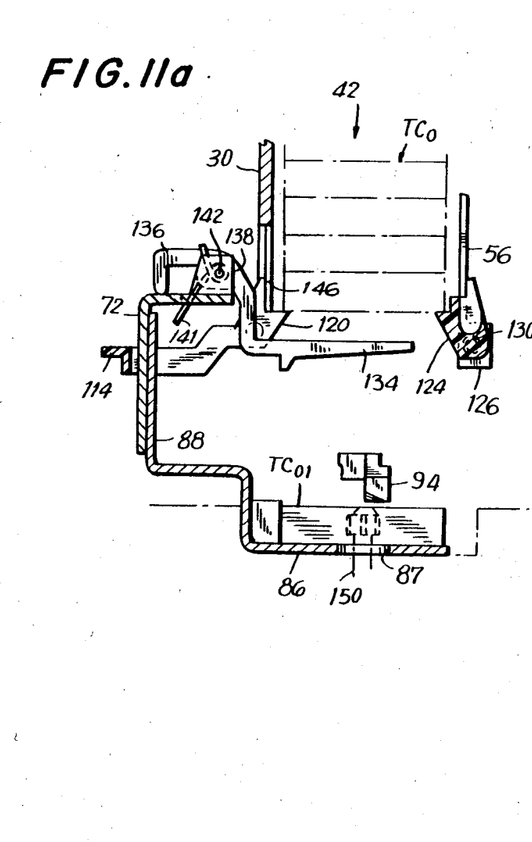
FIGS. 11A, 11B and 11C are side views taken along lines 11A—11A, 11B—11B and 11C—11C of FIGS. 8, 9 and 10, respectively, illustrating the respective positions of the elevator, cassette-support latches and a blocking member, all described in greater detail below.
Figure 11B:
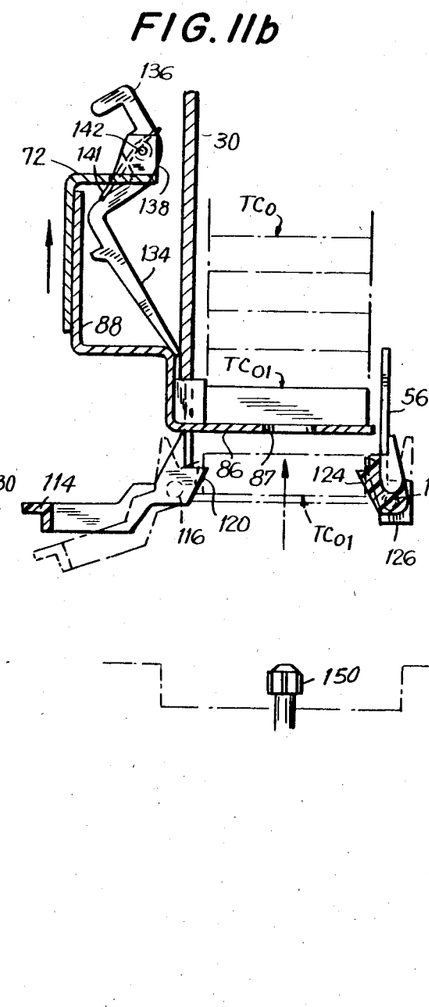
Figure 11C:
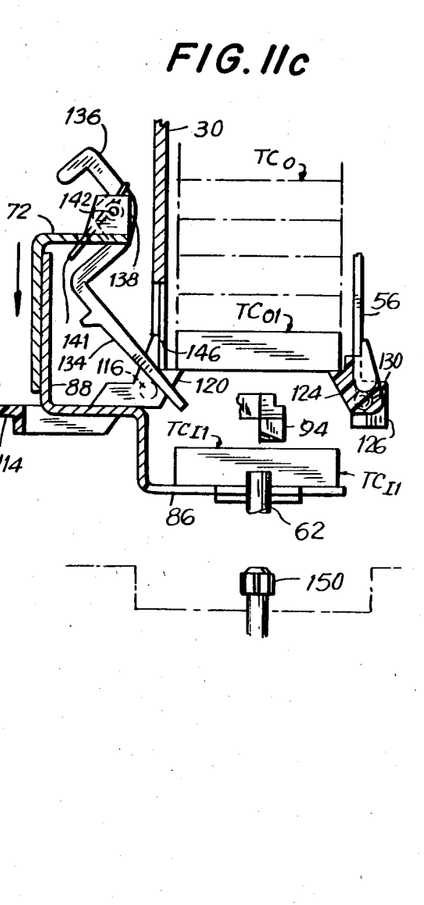

As best seen in FIG. 11, and also shown in FIGS. 2, 6 and 7, blocking member 134 is formed with a finger-like stop member 136, the stop member and blocking member preferably being of unitary construction. Stop member 136 is pivotally coupled to frame 72 of elevator 70. More particularly, frame 72 is provided with a pair of upstanding ears 138 and 140; and stop member 136 is provided with pivot stubs 142 and 144 which are pivotally coupled to ears 138 and 140, respectively. Thus, blocking member 134 is seen to be pivotally coupled to ears 138 and 140 and, thereby, the blocking member is pivotally coupled to elevator frame 72. The stop member limits the counterclockwise rotation of blocking member 134, which rotation is urged by spring 141.

Rear panel 30 is provided with a depending contact member 146, best shown in FIGS. 8–11. It is appreciated that, when elevator 70 is driven in the upward direction, this depending contact member 146 is disposed to intercept blocking member 134. As a result of this interception, a force is exerted in the downward direction on blocking member 134 by contact member 146. Consequently, the blocking member pivots in the downward direction (shown in FIG. 11B) as elevator frame 72 rises. In this manner, the blocking member is pivoted out of its blocking configuration to permit the cassette supported on platform 86 to be raised into the bottom of output hopper 42.

The stack of output cassettes $TC_O$ is supported in output hopper 42 by means of a pair of rear latches 120 and 122 and a front latch 124. As used herein, the designation "rear" refers to those elements aligned with or operable on the rear wall of a cassette, this rear wall being adjacent rear panel 30; and the designation "front" refers to those elements which contact or cooperate with the front wall of the cassette. Thus, rear latches 120 and 122 are adapted to support the bottommost cassette in output hopper 42 in the vicinity of the rear wall thereof, and front latch 124 is adapted to support this cassette in the vicinity of its front wall. In the embodiment described herein, rear latches 120 and 122 are adapted to support the rear corners of the bottom wall of a cassette, and front latch 124 is adapted to support the bottom wall of a cassette along the front edge thereof. As shown in FIGS. 2 and 6-11, rear latches 120 and 122 constitute the respective free ends of U-shaped yoke 114, this yoke being pivotally coupled to a frame 115 which is mounted on the rear surface of rear panel 30 (FIGS. 2 and 7), As shown in FIGS. 2 and 11, yoke 114 is provided with pivot couplings 116 and 118 by which the yoke is pivotally coupled to frame 115. Preferably, one or both of pivot couplings 116 and 118 is provided with a spring bias to maintain the yoke and rear latches 120 and 122 in the supporting configuration illustrated in FIGS. 1, 2 and 11A.

Front latch 124 is pivotally coupled to ears 126 and 128 which extend outwardly from front panels 56 and 54, respectively, as shown in FIGS. 1 and 2. The front latch is provided with stubs 130 and 132, which are pivotally supported in ears 126 and 128, respectively, as shown in FIGS. 1 and 2. Preferably, one or both of these pivot couplings is provided with a spring bias to urge front latch 124 to the configuration illustrated in FIGS. 1, 2 and 11A.

When elevator 70 raises a cassette from the recording deck to output hopper 42, the front and rear edges of the top wall of this cassette engage the illustrated inclined surfaces of front latch 124 and rear latches 120 and 122 so as to pivot these latches in a direction to overcome the spring bias thereon, as shown by the broken lines in FIG. 11B. In this manner, the latches pivot out of interference with the cassette being raised to the bottom of output hopper 42. After this cassette has been raised sufficiently to clear latches 120, 122 and 124, the spring bias forces exerted thereon tend to return those latches to the configuration best seen in FIGS. 11A and 11C, whereby the latches are positioned to support the bottommost cassette in the output stack $TC_O$. Hence, the output stack of cassettes $TC_O$ is supported in output hopper 42 by latches 120, 122 and 124.

As mentioned before, the recording deck, referred to herein as a record/playback deck, is disposed beneath output hopper 42 and is adapted to record and/or play back messages on a cassette which is "loaded" thereon. The record/playback deck, referred to generally by reference numeral 150, may include the usual drive and spindles, capstan, pinch roller, record/playback head, and erase head normally provided on conventional recording apparatus. It is appreciated that, when the record/playback deck is used to record messages on, for example, minicassettes, the capstan and pinch roller can be omitted. Stated generally, the record/playback deck is provided with conventional means to transport the magnetic medium (i.e., the magnetic tape) and record or play back information thereon.

Figures 16, 17, 18:
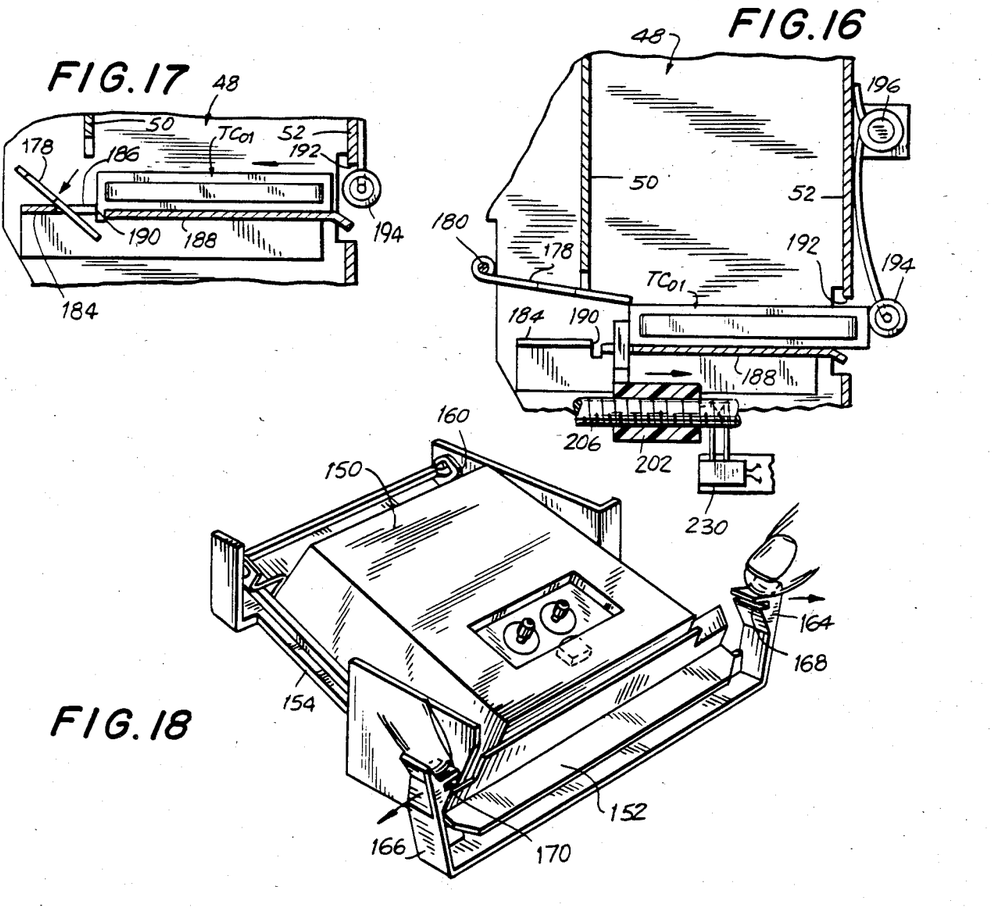
FIG. 16 is a sectional view representing the manner in which the "priority" cassette is fully transported into the priority hopper.
FIG. 17 is a sectional view representing the final disposition of the "priority" cassette into the priority hopper.
FIG. 18 is a perspective schematic view representing the manner in which the recording deck is releasably supported in the changer apparatus.
Figures 19, 20:
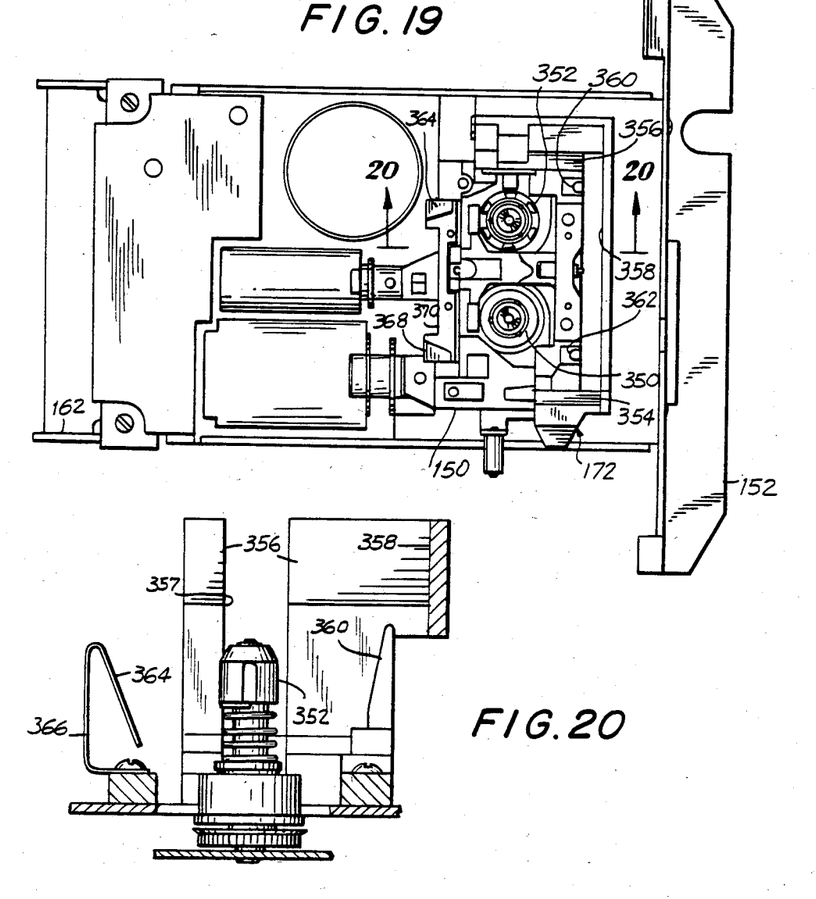
FIG. 19 is a top plan view of the record/playback deck and cassette guide of the present invention.
FIG. 20 is a sectional view taken along lines 20—20 in FIG. 19.
Figure 21:
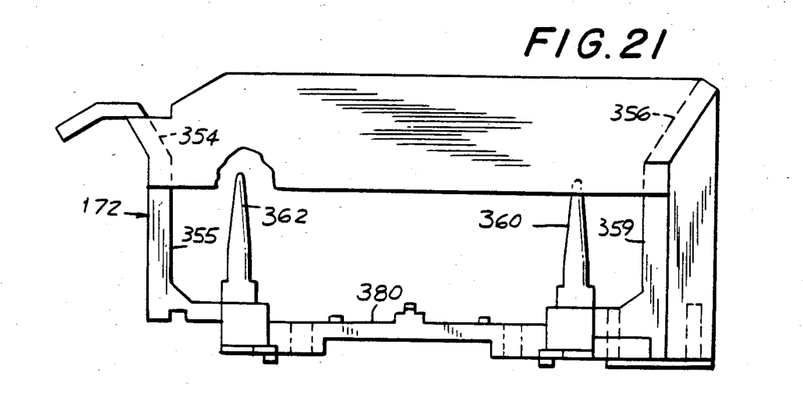
FIG. 21 is a front view of the cassette guide.

Record/playback deck 150 is supported on deck support plate 152 (FIGS. 1, 12 and 18), this support plate being supported, in turn, by a deck support frame 154. Preferably, the deck support frame is formed of resilient material, such as ABS, the rear portion thereof being provided with a pair of bosses 156 and 158 (FIGS. 2, 6 and 7) for supporting hangers 160 and 162 (FIGS. 2, 6, 7 and 18) which extend upwardly from the rear of deck support plate 152. It is seen that the rear portion of record/playback deck 150 is pivotally coupled to deck support frame 154 by way of the cooperation between hangers 160 and 162, and the bosses 156 and 158, respectively. The front portion of deck support frame 154 is provided with a pair of flexible upstanding ears 164 and 166 (FIGS. 1 and 18) that include slots 168 and 170, respectively, to receive and support the front portion of deck support plate 152. As will be explained, in order to gain access to record/playback deck 150 for minor repairs or maintenance or to clear a tape jam, ears 164 and 166 may be manually shifted in respectively outward directions, such as shown in FIG. 18, thereby releasing the front portion of deck support plate 152 and permitting record/playback deck 150 to pivot relative to frame 154 in a downward direction. Hangers 160 and 162 then may be removed from bosses 156 and 158 to withdraw deck 150 from the frame and permit the deck to be repaired or serviced.

The foregoing has described generally the structure of the cassette changer apparatus by which the bottommost cassette in input hopper 28 is withdrawn therefrom, transported to platform 86 of elevator 70 for lowering onto record/playback deck 150 for recording of messages, and then, after the recording operation has been completed, elevator 70 raises this cassette to the bottom of output hopper 42 and returns platform 86 to a position for receiving a fresh cassette. As mentioned above, it is one feature of the present invention to discharge from output hopper 42 a cassette which has been designated a "priority" cassette. Such priority discharge apparatus is comprised of a priority eject finger 198 (FIGS. 2 and 14-17), a lead screw 206 and a pivotable flapper 178 (FIGS. 2, 8-10 and 14-17) disposed in the vicinity of priority hopper 148. Priority eject finger 198 is provided with a leg 200 and is secured to a lead screw follower 202. Advantageously, leg 200 and lead screw follower 202 are of unitary construction. A bias spring 204 disposed within the bore of lead-screw follower 202 serves to bias this follower to lead screw 206. As will be described below, as a result of this biasing, priority eject finger 198 tends to rotate with the rotation of lead screw 206. That is, if the lead screw rotates in a clockwise direction, eject finger 198 likewise rotates in this clockwise direction so as to rotate leg 200. Conversely, if lead screw 206 rotates in the counterclockwise direction, eject finger 198 likewise rotates in the counterclockwise direction to rotate leg 200.

Figures 12, 13:
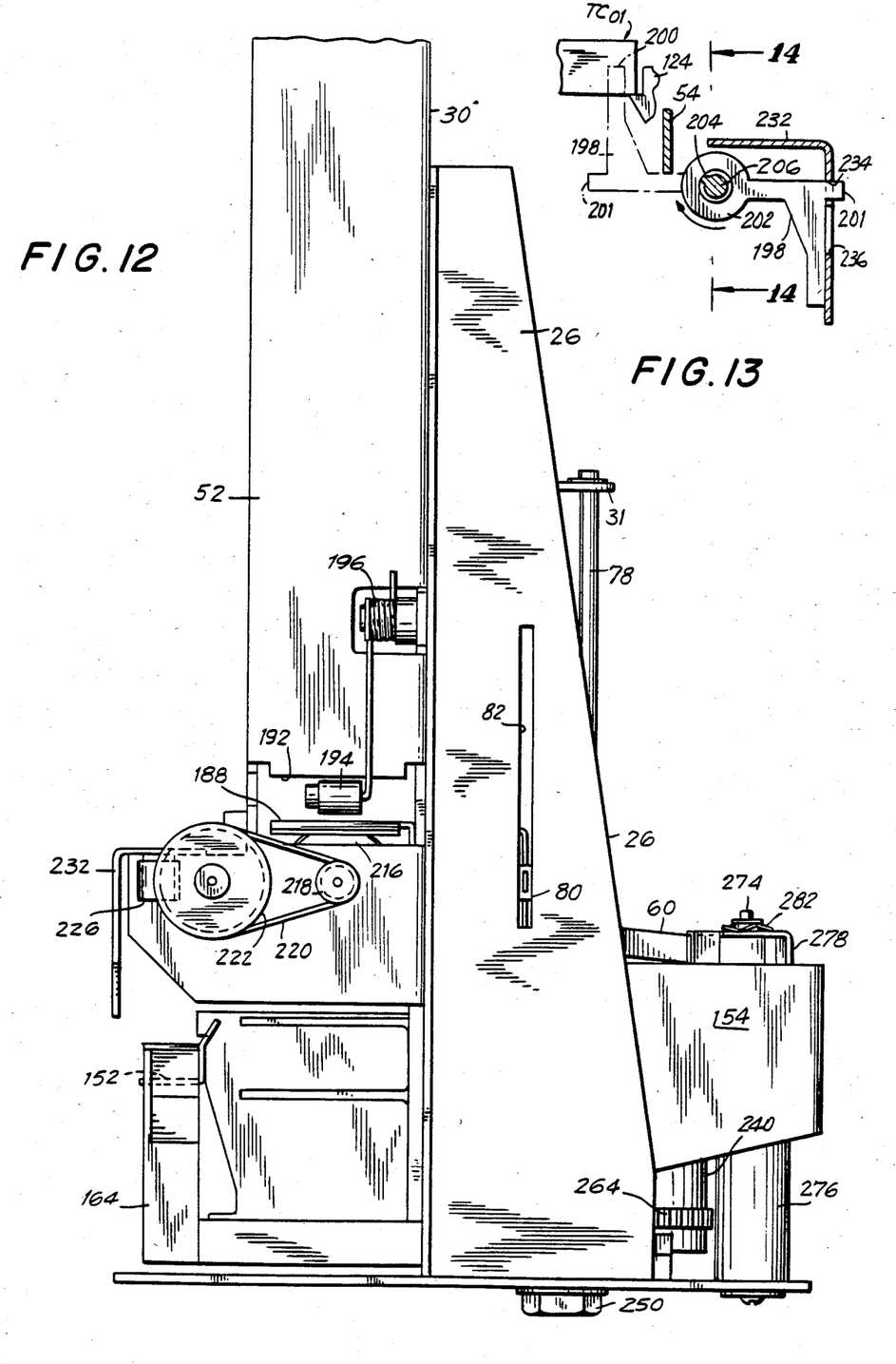
FIG. 12 is a right side view of a changer apparatus, taken along the line 12—12 of FIG. 2.
FIG. 13 is a side sectional view of the priority eject mechanism used with the present invention.

The opposite ends of lead screw 206 are disposed in bushings 208 and 210 (FIG. 2) which, in turn, are supported in lead screw support brackets 212 and 214 secured to front panel 54 and to leg 34, respectively. A priority drive motor 216 has its drive shaft coupled to a pulley 218 which is entrained by a drive belt 220 with a lead screw pulley 222. As shown in FIGS. 2 and 12, lead screw pulley 222 is coupled to one end, for example, tne rightmost end, of lead screw 206 to rotate the lead screw in a direction determined by the direction of rotation of drive motor 216. A pair of stop members 224 and 226 are disposed in the vicinity of the opposite ends of lead screw 206 and serve to prevent over-travel of eject finger 198 in the event that priority drive motor 216 fails to be de-energized as will be described. Motor switches 228 and 230 also are disposed in the vicinity of the opposite ends of lead screw 206 and are adapted to be contacted by eject finger 198 when this finger has been driven to its leftmost, or start (or standby), position, and to its rightmost, or limit position, respectively.

As shown in FIGS. 1 and 2, a shield 232 overlies lead screw 206, this shield being provided with an elongated slit 234 therein. Slit 234 has a vertical notch 236 at the left end thereof and an enlarged notch 238 at the right end thereof. As can be seen from FIG. 14, eject finger 198 is provided with a heel 201 which projects ourwardly from elongated slit 234. When the eject finger is disposed at its start, or standby, position (FIG. 2), heel 201 is aligned with vertical notch 236. Hence, when lead screw 206 rotates in the clockwise direction, eject finger 198 likewise rotates (because of biasing exerted by spring 204) and heel 201 passes through vertical notcn 236 to permit the eject finger to rotate to the position represented by broken lines in FIG. 13. In this configuration, leg 200 is adapted to contact the left side wall of the bottommost cassette in output hopper 42. As lead screw 206 continues to rotate, the bottom edge of front panel 54 (FIG. 13) prevents further rotation of eject finger 198, thereby permitting lead-screw follower 202 to "follow" the rotation of the lead screw. As a consequence, the cassette which is contacted by leg 200 is discharged from output hopper 42 and is driven into priority hopper 148.

This "priority" cassette remains within the priority hopper when priority drive motor 216 is reversed to drive lead screw 206 in the opposite direction. The reversal of the priority drive motor is triggered when eject finger 198 reaches its limit position and contacts limit switch 230 to cause the energization of tne priority drive motor to reverse. When at its limit position, eject finger 198 is in the vicinity of enlarged notch 238; and the eject finger rotates with the rotation of lead screw 206 (again, because of the biasing exerted by spring 204) to position heel 201 against the upper edge of elongated slot 234. Further rotation of eject finger 198 thus is prevented; and lead-screw follower 202 now "follows" the counterclockwise rotation of lead screw 206 to drive the eject finger back to its starting or standby position. It is appreciated that shield 232 thus functions to limit the rotation of eject finger 198 with the rotation of lead screw 206 so as to permit the eject finger to be properly positioned as it is driven along the lead screw.

Initially, priority eject finger 198 exhibits the standby position illustrated by solid lines in FIG. 13. In particular, heel 201 of leg 200 is disposed within vertical notch 236 illustrated at the left end of elongated slit 234 in shield 232 (FIG. 1).

Upon energization thereof, priority drive motor 216 rotates lead screw 206 in the clockwise direction. As a result, lead-screw follower 202 of eject ringer 198 also rotates in the clockwise direction due to the spring bias force which urges bias spring 204 within the bore of the lead-screw follower against the lead screw. Accordingly, eject finger 198 rotates in the clockwise direction, and heel 201 thereof is rotatably withdrawn from vertical notch 236. The eject finger thus exhibits the position represented by the broken lines in FIG. 13. In this position, leg 200 contacts the left side wall of cassette $TC_{O1}$, the bottommost cassette in output hopper 42. This contact of leg 200 with cassette $TC_{O1}$ is illustrated more particularly in FIG. 14.

As lead screw 206 continues to rotate, further rotation of eject finger 198 is inhibited by the contact between the lower edge of front panel 54 with eject finger 198, as shown in FIG. 13. Thus restrained from further rotation, lead-screw follower 202, and thus, eject finger 198, is driven by the rotation of the lead screw in the direction of the arrow shown in FIG. 14. Hence, bottommost cassette $TC_{O1}$ is discharged from output hopper 42 to a priority hopper 48. As eject finger 198 is driven, the contacts of limit switch 228 are permitted to open.

Figures 14, 15:
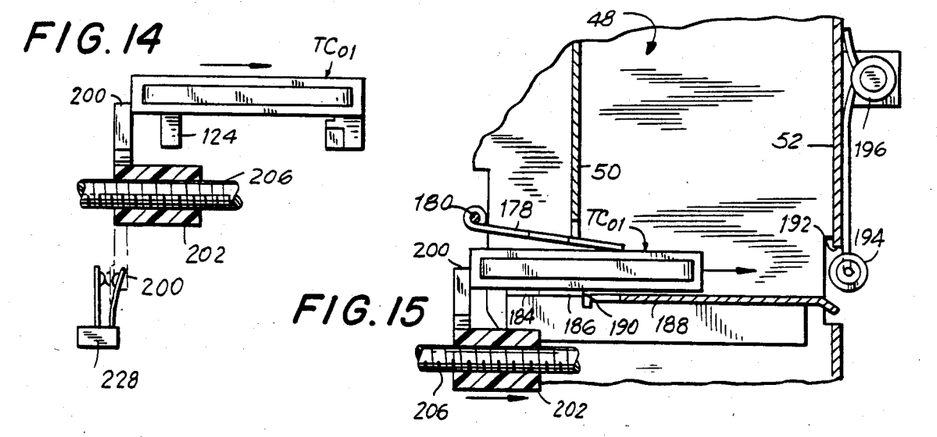
FIG. 14 is a front sectional view taken along the line 14—14 in FIG. 13 and illustrating the manner in which a "priority" cassette is ejected from the output hopper.
FIG. 15 is a sectional view representing the transport of the "priority" cassette by the priority eject mechanism toward the priority hopper.

As cassette $TC_{O1}$ is discharged by eject finger 198, the leading edge of this cassette contacts pivotable flapper 178. As shown in FIGS. 2 and 15. flapper 178 is coupled by pivot coupling 180 to a mounting support 182 which, as shown in FIG. 2, is integral with side wall 46. The free end of flapper 178 normally is disposed within aperture 186 of discharge platform 184. However, as cassette $TC_{O1}$ passes through entry slot 68 of side wall 46, it contacts flapper 178 to pivot that flapper in the counterclockwise direction about pivot coupling 180, as shown in FIG. 15. In the event that other cassettes are supported on priority hopper platform 188 at the bottom of priority hopper 48, this pivoting of flapper 178 serves to raise the left side of such cassettes to allow the leading edge of cassette $TC_{O1}$ to pass thereunder. Further rotation of lead screw 206 drives cassette $TC_{O1}$ fully onto priority hopper platform 188 and beneath the stack of cassettes that may be stored in the priority hopper.

As shown in FIG. 16, eject finger 198 serves to fully discharge cassette $TC_{O1}$ beyond discharge platform 184 and through an overshoot slot 192 provides in side wall 52. A spring-biased return finger 194 is disposed in overshoot slot 192, this finger being coupled to a spring 196 which, as shown in FIG. 12, is mounted on the outside surface of side wall 52. The spring bias force exerted on return finger 194 by spring 196 is overcome by tne driving force exerted on cassette $TC_{O1}$ by eject finger 198.

Lead screw 206 continues to rotate to drive eject finger 198 until the eject finger closes the contacts of limit switch 230. As shown in FIG. 16, the contacts of the limit switch are closed by the engagement thereagainst of, for example, lead-screw follower 202. It will be appreciated that the contacts of limit switch 230 are closed when eject finger 198 has driven cassette $TC_{O1}$ sufficiently to pass beyond the free end of flapper 178, thereby permitting the flapper to return to its normal position illustrated in FIG. 17.

The priority discharge control electronics (not shown) is responsive to the closure of the contacts of limit switch 230 to reverse the energization of priority drive motor 216. As a result of this reversal, lead screw 206 is driven in a counterclockwise direction, and lead-screw follower 202, which is spring-biased toward the lead screw, rotates with the lead screw to rotate eject finger 198 such that heel 201 thereof extends through enlarged notch 238. Further rotation of the eject finger is inhibited when heel 201 contacts the upper edge of elongated slit 234 in shield 232.

Now, as lead screw 206 continues to rotate in the counterclockwise direction, lead-screw follower 202 is driven back to its standby position, that is, toward limit switch 228. Cassette $TC_{O1}$ is driven by biased return finger 194 to move in the direction indicated by the arrow of FIG. 17. It is seen that a step 190 is provided between the discharge platform 184 and priority hopper platform 188 to restrain further leftward movement of cassette $TC_{O1}$. This step serves to register cassette $TC_{O1}$ in priority hopper 48.

Eject finger 198 now may be driven until it closes the contacts of limit switch 228, whereupon the priority control electronics de-energizes priority drive motor 216. The priority discharge apparatus now is in condition to discharge the next "priority" cassette that may be ejected to output hopper 42 in the manner described above.

While the present invention has been particularly shown and described with respect to a preferred embodiment thereof, it will be readily appreciated by those of ordinary skill in the art that various changes and modifications may be made. For example, a respective input hopper, output hopper, and priority hopper have been illustrated as being formed as vertical hoppers to store vertical stacks of cassettes. Alternatively, such hoppers may take the form of horizontal hoppers; and adjustments to accommodate the horizontal movement of a cassette may be made in the apparatus that has been described above. Furthermore, although desirable, the use of blocking member 134 may be omitted. However, this blocking member advantageously prevents the inadvertent dislocation of a cassette from output hopper 42 to interfere with record/playback deck 150. Still further, it is appreciated that modifications and changes in design details may be made, as desired.

Advantageously, a single cam 240 is used to coordinate the operations of pusher arm 60 and elevator 70 without requiring electronic control over separate motors to effect such coordination.

It is intended that the appended claims be interpreted as including the preferred embodiment described above as well as variations and modifications which will become apparent to those of ordinary skill in the art. The terms of the claims thus should not be viewed as limiting the present invention solely to such terms, but rather, the claims are intended to cover equivalents of the disclosed structure.

What is claimed is:

1. In changer apparatus of the type having a recording deck to which individual recording media are transported, one at a time, and an output stack for receiving and storing in stack configuration recording media that have been removed from said recording deck; and means for laterally transporting a recording medium to said output stack, the improvement comprising lifting means disposed at said output stack and contacted by the recording medium that is laterally transported to said output stack to raise those recording media than stored in said output stack in response to a force exerted thereon by the contacting recording medium, whereupon said laterally transported recording medium is positioned as the bottommost medium in said output stack.

2. The improvement of claim 1 wherein said lifting means comprises a pivotable flapper; and wherein said output stack includes an entry through which a laterally transported recording medium passes, said pivotable flapper being located in the vincinity of said entry and pivotable in response to said force from a first position which blocks said entry to a second position which raises the recording media then stored in said output stack.

3. The improvement of claim 2 wherein said changer apparatus includes an output hopper for receiving each recording medium from said recording deck; means for discharging a recording medium from said recording deck to said output hopper; and priority eject means selectively operable to laterally transport from said output hopper to said output stack the recording medium last received by said output hopper.

4. In changer apparatus of the type having a recording deck to which individual recording media are transported, one at a time, and an output stack for receiving and storing in stack configuration recording media that have been removed from said recording deck, said output stack having an entry through which a transported recording medium passes; and means for laterally transporting a recording medium to said output stack, the improvement comprising a pivotable flapper located in the vicinity of the entry of said output stack and pivotable from a first position which blocks said entry to a second position which raises the recording media then stored in said output stack when said flapper is contacted by the recording medium that is transported to said output stack, said recording medium being driven sufficiently into said output stack to enable said pivotable flapper to return to the first position thereof; and bias means in said output stack to urge the laterally transported recording medium to a predetermined location as the bottommost recording medium in said output stack.

5. Apparatus for stocking articles transported thereto in a predetermined direction, comprising: a hopper formed of plural vertical walls for storing a stack of articles; an entry into said hopper through which an article is transported; a flapper disposed in the vicinity of said entry and normally blocking said entry from free passage of an article therethrough; and pivot support means for supporting said flapper and for defining a pivot axis substantially normal to said predetermined direction; whereby said flapper pivots about said pivot axis in response to a force exerted thereon by an article transported thereto so as to raise the stacked articles stored in said hopper by reason of the pivoting thereof and to admit the transported article into the bottom of said stack.

6. The apparatus of claim 5 wherein said flapper has one end coupled to said pivot support means and a free end that pivots in an upward direction in response to said force exerted by the transported article, thereby to raise the stacked articles.

7. The apparatus of claim 6 wherein said hopper includes a platform having an aperture therein; and wherein said flapper normally extends from said pivot support means through said aperture.

8. The apparatus of claim 6 wherein said flapper normally extends in a downward direction from said one end to said free end thereof.

9. The apparatus of claim 7 wherein said platform includes a step in the vicinity of said entry and over which the transported article passes for admittance to said hopper.

* * * * *